(12) United States Patent
Belling et al.

(10) Patent No.: US 12,520,354 B2
(45) Date of Patent: Jan. 6, 2026

(54) METHODS AND APPARATUSES FOR USER PLANE FUNCTION CONTROL FOR MULTICAST TRANSPORT

(71) Applicant: NOKIA TECHNOLOGIES OY, Espoo (FI)

(72) Inventors: Thomas Belling, Erding (DE); Bruno Landais, Pleumeur-Bodou (FR); Laurent Thiebaut, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 421 days.

(21) Appl. No.: 18/020,805

(22) PCT Filed: Jul. 15, 2021

(86) PCT No.: PCT/EP2021/069766
§ 371 (c)(1),
(2) Date: Feb. 10, 2023

(87) PCT Pub. No.: WO2022/033797
PCT Pub. Date: Feb. 17, 2022

(65) Prior Publication Data
US 2023/0269795 A1    Aug. 24, 2023

Related U.S. Application Data

(60) Provisional application No. 63/063,739, filed on Aug. 10, 2020.

(51) Int. Cl.
*H04W 76/40*   (2018.01)
*H04W 76/12*   (2018.01)

(52) U.S. Cl.
CPC .......... *H04W 76/12* (2018.02); *H04W 76/40* (2018.02)

(58) Field of Classification Search
CPC ..... H04W 76/12; H04W 76/40; H04W 92/24; H04W 76/11; H04L 12/185; H04L 12/189
See application file for complete search history.

(56) References Cited

U.S. PATENT DOCUMENTS

2022/0408228 A1\* 12/2022 Xiong .................. H04W 4/06
2023/0171845 A1\* 6/2023 Ma ...................... H04W 76/12
                                                                370/312

OTHER PUBLICATIONS

3GPP244 (3rd Generation Partnership Project; Technical Specification Group Core Network and Terminals; Interface between the Control Plane and the User Plane Nodes; Stage 3, 3GPP TS 29.244, Release 16, CT WG4, V16.4.0 Jul. 6, 2020).\*

(Continued)

*Primary Examiner* — Lakeram Jangbahadur
(74) *Attorney, Agent, or Firm* — Carter, DeLuca & Farrell LLP

(57) ABSTRACT

Methods, apparatuses and computer readable medium for user plane function control for multicast transport. A method includes sending (300) a session establishment request to a user plane function requesting the user plane function to apply multicast and supply identifiers for outgoing packets. The method also includes receiving (305) from the user plane function a multicast response comprising the requested identifiers. The method also includes establishing (605) a multicast tunnel with a network node.

1 Claim, 5 Drawing Sheets

(56) References Cited

OTHER PUBLICATIONS

3GPP316 ("3rd Generation Partnership Project; Technical Specification Group Services and System Aspects; Wireless and wireline convergence access support for the 5G System (5GS) (Release 16)", 3GPP Standard; Technical Specification; 3GPP TS 23.316, V16.4.0 Jul. 9, 2020).*

International Search Report and Written Opinion dated Oct. 22, 2021 corresponding to International Patent Application No. PCT/EP2021/069766.

Nokia et al., "Key issue 1 new solution for interactions between MBSF and MBSU," 3GPP Draft; S2-2006309, SA WG2 Meeting #140E, Electronic meeting, Aug. 19-Sep. 1, 2020, Sep. 1, 2020, XP051928843.

3GPP TS 29.244 V16.4.0 (Jun. 2020), Technical Specification, 3rd Generation Partnership Project; Technical Specification Group Core Network and Terminals; Interface between the Control Plane and the User Plane Nodes; Stage 3 (Release 16), Jun. 2020.

3GPP TS 23.316 V16.4.0 (Jul. 2020), Technical Specification, 3rd Generation Partnership Project; Technical Specification Group Services and System Aspects; Wireless and wireline convergence access support for the 5G System (5GS) (Release 16), Jul. 2020.

3GPP TS 23.501 V16.5.1 (Aug. 2020), Technical Specification, 3rd Generation Partnership Project; Technical Specification Group Services and System Aspects; System architecture for the 5G System (5GS); Stage 2 (Release 16), Aug. 2020.

3GPP TR 23.757 V0.4.0 (Jun. 2020), Technical Report, 3rd Generation Partnership Project; Technical Specification Group Services and System Aspects; Study on architectural enhancements for 5G multicast-broadcast services (Release 17), Jun. 2020.

5G X-Cast, Broadcast and Multicast Communication Enablers for the Fifth-Generation of Wireless Systems, Deliverable D4.3 Session Control and Management, Version v2.0, May 30, 2019.

* cited by examiner

METHODS AND APPARATUSES FOR USER PLANE FUNCTION CONTROL FOR MULTICAST TRANSPORT

CROSS-REFERENCE TO RELATED APPLICATION

This application claims priority to U.S. Provisional Application No. 63/063,739 filed Aug. 10, 2020, the content of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for user plane function control for multicast transport.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

According to a first embodiment, a method may include sending a session establishment request to a user plane function requesting the user plane function to apply multicast and supply identifiers for outgoing packets. The method may include receiving from the user plane function a multicast response comprising the requested identifiers. The method may include establishing a multicast tunnel with a network node.

In a variant, establishing the multicast tunnel may comprise forwarding the identifiers to the network node. In a variant, the identifiers may comprise at least one of a source Internet Protocol (IP) address, a source specific destination IP multicast address, or a general packet radio service tunneling protocol (GTP) tunnel identifier. In a variant, the session establishment request may be for a source specific multicast and requests the allocation of a source Internet Protocol (IP) address, a source specific destination IP multicast address, and a general packet radio service tunneling protocol (GTP) tunnel identifier, or may be for a non-source specific multicast and provides a non-source specific destination IP multicast address and requests the allocation a general packet radio service tunneling protocol (GTP) tunnel identifier. In a variant, the session establishment request may comprise a new multicast control information element that comprises a multicast control information element identifier, and for at least one of a source Internet Protocol (IP) address, a destination IP multicast address, or a general packet radio service tunneling protocol (GTP) tunnel identifier either the requests for the allocation of a value by the user plane function or an applicable value.

In a variant, the session establishment request may comprise a forwarding action rule and a packet detection rule, the forwarding action rule may comprise an instruction for the user plane function to apply multicast and the multicast control information element identifier, and send outgoing multicast packets associated with the forwarding action rule, and the packet detection rule may comprise an instruction for the user plane function of which incoming packets should be forwarded according to the forwarding action rule. In a variant, the session establishment request may comprise a forwarding action rule with information elements requesting the user plane function to allocate the identifiers. In a variant, the method may further comprise receiving the session establishment response comprising the forwarding action rule with said identifiers selected by the user plane function. In a variant, the method may further comprise receiving a session establishment response comprising the identifiers selected by the user plane function. In a variant, the session establishment response may comprise a multicast control information element with the same multicast control information element identifier as sent in the session establishment request and the identifiers selected by the user plane function.

According to a second embodiment, a method may include receiving a session establishment request from a control plane function to apply multicast and supply identifiers for outgoing packets. The method may include selecting the identifiers requested by the control plane function. The method may include sending to the control plane function, a multicast response comprising the selected identifiers. The method may include sending to a network node an outgoing packet comprising the identifiers.

In a variant, the method may further comprise receiving an incoming packet from a network node with content to be distributed to one or more user equipment. In a variant, the method may further comprise forwarding the incoming packet as an outgoing packet with the selected identifiers. In a variant, the method may further comprise encapsulating the incoming packet as content in a new Internet Protocol (IP) and general packet radio service tunneling protocol (GTP) packet with the selected identifiers added to the new IP and GTP packet. In a variant, the identifiers may comprise at least one of a source Internet Protocol (IP) address, a source specific destination IP multicast address, or a general packet radio service tunneling protocol (GTP) tunnel identifier. In a variant, the GTP tunnel identifier may be selected from a range assigned to a user plane function. In a variant, the session establishment request may be for a source specific multicast and requests the allocation of a source Internet Protocol (IP) address, a source specific destination IP multicast address, and a general packet radio service tunneling protocol (GTP) tunnel identifier, or a non-source specific multicast and provides a non-source specific destination IP multicast address and requests the allocation a general packet radio service tunneling protocol (GTP) tunnel identifier.

In a variant, the session establishment request may comprise a new multicast control information element that comprises a multicast control information element identifier, and for at least one of a source Internet Protocol (IP) address, a destination IP multicast address, or a general packet radio service tunneling protocol (GTP) tunnel identifier either the requests for the allocation of a value by the user plane function or an applicable value. In a variant, the session establishment request may comprise a forwarding action rule and a packet detection rule, the forwarding action rule may comprise an instruction for a user plane function to apply multicast and the multicast control information element identifier, and send outgoing multicast packets associated with the forwarding action rule, and the packet detection rule may comprise an instruction for the user plane function of which incoming packets should be forwarded according to the forwarding action rule. In a variant, the session establishment request may comprise a forwarding action rule with information elements requesting the user plane function to allocate the identifiers. In a variant, the method may further comprise sending the session establishment response comprising the forwarding action rule with said identifiers selected by the user plane function. In a variant, the method may further comprise sending a session establishment response comprising the multicast control information element with the multicast control information element identifier and the identifiers selected by the user plane function, or the forwarding action rule with the identifiers selected by the user plane function.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to cause the apparatus to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for user plane function (UPF) control for multicast transport.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

Architectural enhancements for 5G multicast-broadcast services are described in $3^{rd}$ Generation Partnership Project (3GPP). Competing baseline architectures 1 and 2 in 3GPP may include a UPF controlled by a session management function (SMF) to distribute multicast content. In certain cases, an N4 interface and related packet forwarding control protocol (PFCP) may be defined between the UPF and SMF.

Architecture 1 may include a multicast service function user plane (MSF-U) controlled by a multicast service function control plane (MSF-C), and architecture 2 may include a multicast/broadcast user plane (MBSU) controlled by a multicast/broadcast service function (MBSF) for similar tasks. Both architectures resemble a split broadcast-multicast service center (BM-SC), and it is expected that an interface and protocol similar to N4/PFCP may be used between those entities. In addition, a CP function may be defined as MSF-C, network exposure function (NEF), MBSF, or SMF. Furthermore, a UP function may be defined as a UPF, MSF-U, or MBSU.

Figure 1:
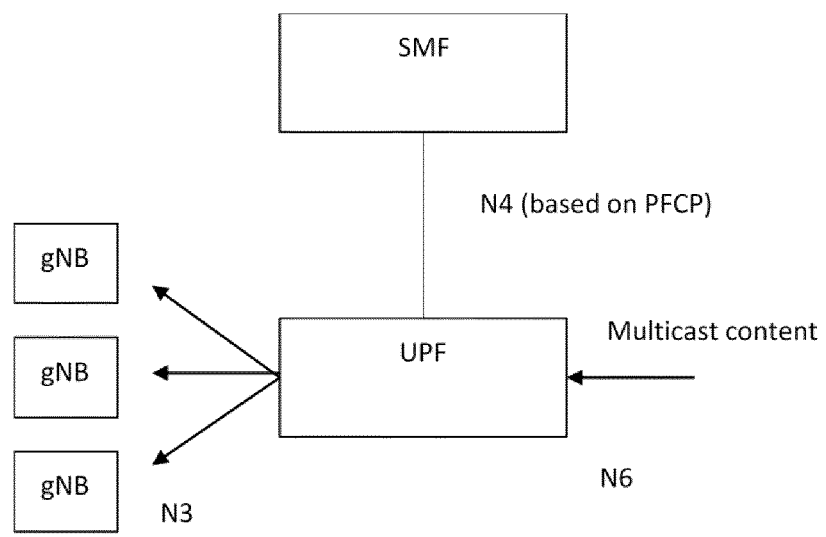
FIG. 1 illustrates an example 5G multicast-broadcast architecture.

FIG. 1 illustrates an example 5G multicast-broadcast architecture. As illustrated in FIG. 1, the UPF may need to send multicast content to downstream entities (e.g., 5G AN), such as a wireline access gateway function (W-AGF) for wireline access, or radio access network (RAN) such as a gNB. Moreover, in some instances, both unicast and multicast delivery of the multicast content may be needed. In addition, related N4 procedures and PFCP extensions may need to be defined. Furthermore, the UPF may receive multicast content over N6 via point to point (P2P) or multicast/broadcast (P2M). As further illustrated in FIG. 1, the SMF may be able to control the UPF delivery of the multicast content over N3 to the 5G AN entities.

Certain resource allocation procedures for broadcast have been available. One procedure may not include related interaction with policy control function (PCF) for policy and charging control for simplicity. For instance, one procedure may include a network resource allocation for broadcast where an SMF may initiate an N4 session establishment/modification procedure with the UPF. The SMF may also provide forwarding rules to the UPF, which may include, for example, multicast address used by a 5G-Xcast user plane function (XUF) for data transmission. In addition, the UPF may provide the downlink (DL) tunnel information if multicast tunneling in the core network is used. Further, in the procedure, the UPF may provide an N4 session establishment/modification response. Here, the UPF may provide the SMF with the DL tunnel information if multicast tunneling in the core network is used, and the SMF did not allocate the DL tunnel. In addition, the UPF may perform necessary signaling to join the multicast tree, and be able to receive data from the XUF. However, such allocation resource procedures do not include a detailed description of the content of the DL tunnel information.

Figure 2:
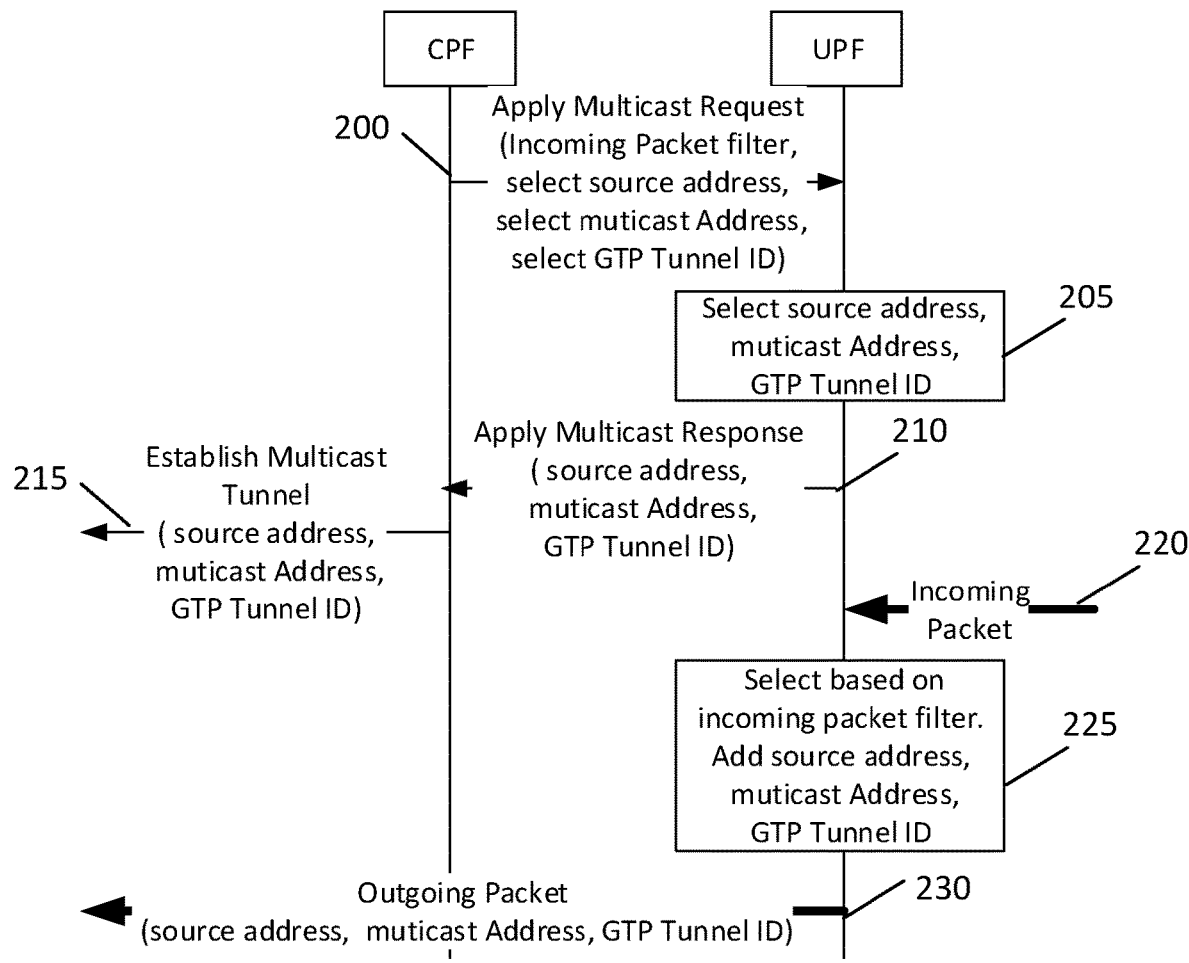
FIG. 2 illustrates a signal flow diagram of communications between a control plane function and a user plane function, according to certain example embodiments.

FIG. 2 illustrates a signal flow diagram of communications between the control plane function (CPF) and user plane function (UPF), according to certain example embodiments. As illustrated in FIG. 2, certain example embodiments may provide a controller including, for example, a CP function or CPF. In certain example embodiments, the controller may, at 200, request for source specific multicast including, for example, source IP address. The controller may also request for source specific multicast including, for example, IP multicast address or general packet radio service (GPRS) tunneling protocol (GTP) tunnel ID.

In certain example embodiments, the CPF may provide a multicast address for non-source specific multicast. The CPF may also instruct the UPF to apply multicast, and supply the assigned identifiers for outgoing packets. In addition, at 205, the UPF may be instructed by the CPF to select the outgoing packets for which multicast applies. In some example embodiments, the UPF may select the requested identifiers and return them to the CPF: The UPF may select a source IP address from a range of one or several source IP addresses assigned to itself, and select a GTP tunnel ID from a range assigned to itself. In certain example embodiments, the UPF may select the destination multicast address from a range reserved by an Internet Assigned Name Authority (IANA) for source specific multicast, and the destination multicast address may then be unique within the scope of the source IP address selected by the UPF.

According to certain example embodiments, at 210, the UPF may provide the GPT tunnel ID and, for source specific multicast, assigned source IP address and assigned multicast IP address to the CPF. Further, at 215, the CPF may forward the GTP tunnel ID, multicast IP address and, for source specific multicast, the assigned source IP address in control signaling toward another node (e.g., an access and mobility management function (AMF) or access network node). In addition, at 220, the UPF may receive an incoming packet with content to be distributed to multiple user equipment from a network node, for instance from a node of the public safety node or a node distributing television content via IP. Further, at 225, the UPF may select a packet based on an incoming packet filter. In addition, at 225, the UPF may add the selected source address, multicast address, and GTP tunnel ID to the selected packet. At 230, the UPF may send the selected packet to a third node, for instance a node in the access network such as an eNB or gNB. The third node may have received the GTP tunnel ID, multicast IP address and, for source specific multicast, the assigned source IP address from the another node. According to certain example embodiments, the outgoing packet sent to the third node may include the source address, the multicast address, and the GTP tunnel ID.

Certain example embodiments may provide various PFCP implementations. In one implementation according to certain example embodiments, a new multicast control information element IE in the PFCP session establishment request may be sent from CPF to UPF. This may be for a source specific multicast, and the request may include a multicast control information element ID selected CPF. In addition, the request may request the UPF to allocate a source IP address, a source specific IP multicast address, and a GTP tunnel ID.

In certain example embodiments, for a non-source specific multicast, the new multicast control information IE in the PFCP session establishment request may be sent from the CPF to the UPF. Here, the request may include a multicast control information element ID selected by the CPF, and an IP multicast address. In addition, the request may request the UPF to allocate a GTP tunnel ID. Furthermore, in this PFCP implementation, a DL forwarding action rule (FAR) in the PFCP session establishment request may be sent from the CPF to the UPF. In certain example embodiments, the request may include instructions to apply multicast (e.g., a flag in the forwarding action), and include the multicast control information element ID to request the UPF to send outgoing multicast packets associated with that FAR. According to certain example embodiments, the outgoing multicast packets may be sent with the IP multicast address as destination address, the GTP tunnel ID, and the source IP address associated with the multicast control information IE.

According to certain example embodiments, the PFCP session establishment request may also include a packet detection rule (PDR) that provides the IP of the Far to instruct the UPF for which incoming packets forwarding is to be performed according to the FAR. Further, within the PFCP session establishment or modification response, the UPF may provide the multicast control information IE with the multicast control information element ID and the identifiers selected by the UPF. In certain example embodiments, the identifiers may include, for source specific multicast, a source IP address. The identifiers may also include, for a source specific multicast, an IP multicast address. In addition, the identifiers may include a GTP tunnel ID. In some example embodiments, a new UP function feature for the above procedure may be introduced.

According to certain example embodiments, another PFCP implementation may be provided. For instance, for a source specific multicast, a DL FAR in the PFCP session establishment request may be sent from the CPF to the UPF. The request may include information elements to request the UPF to allocate a source IP address, a source specific IP multicast address, and a GTP tunnel ID. According to other example embodiments, for a non-source specific multicast, a DL FAR in the PFCP session establishment request may be sent from the CPF to the UPF. The request may include an IP multicast address, and information elements to request the UPF to allocate a GTP tunnel ID.

In certain example embodiments, with the PFCP session establishment or modification response, the UPF may provide the FAR with the identifiers selected by the UPF. According to certain example embodiments, these identifiers may include, for a source specific multicast, a source IP address. The identifiers may also include, for a source specific multicast, an IP multicast address. Further, the identifiers may include a GTP tunnel ID. In certain example embodiments, the PFCP session establishment request may also include a packet detection rule that provides the IP of the FAR to instruct the UPF for which incoming packets forwarding is to be performed according to the FAR. Further, some example embodiments, a new UP function feature may be provided for this additional PFCP implementation.

Figure 3:
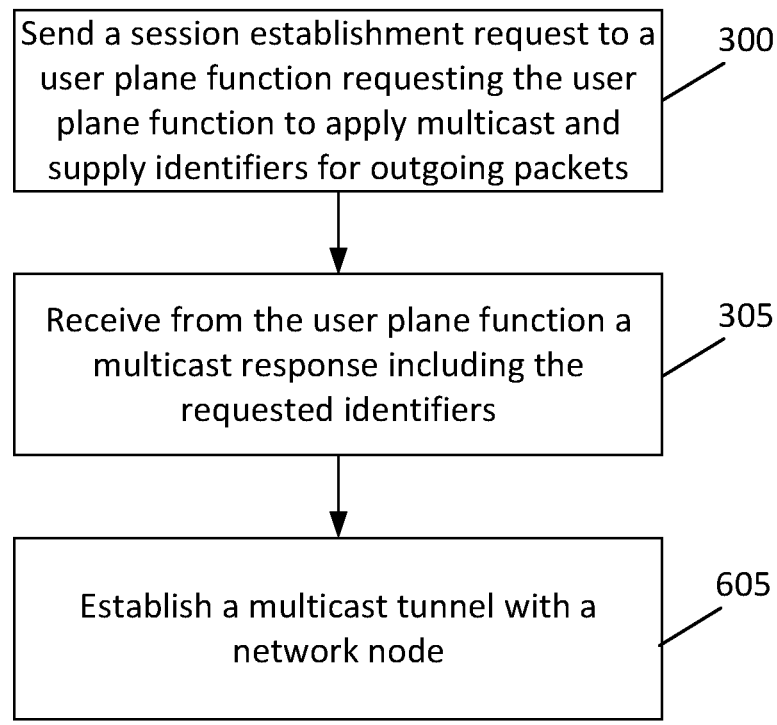
FIG. 3 illustrates a flow diagram of a method, according to certain example embodiments.

FIG. 3 illustrates a flow diagram of a method, according to certain example embodiments. In certain example embodiments, the flow diagram of FIG. 3 may be performed by a telecommunications network, network entity or network node in a 3GPP system, such as LTE or 5G-NR. For instance, in an example embodiment, the method of FIG. 3 may be performed by a CPF, for instance similar to apparatus 10 illustrated in FIG. 5(a).

According to certain example embodiments, the method of FIG. 3 may include, at 300, sending a session establishment request to a user plane function requesting the user plane function to apply multicast and supply identifiers for outgoing packets. The method may also include, at 305, receiving from the user plane function a multicast response including the requested identifiers. The method may further include, at 310, establishing a multicast tunnel with a network node.

According to certain example embodiments, establishing the multicast tunnel may include forwarding the identifiers to the network node. According to other example embodiments, the identifiers may include at least one of a source Internet Protocol (IP) address, a source specific destination IP multicast address, or a general packet radio service tunneling protocol (GTP) tunnel identifier. According to further example embodiments, the session establishment request may be for a source specific multicast and requests the allocation of a source Internet Protocol (IP) address, a source specific destination IP multicast address, and a general packet radio service tunneling protocol (GTP) tunnel identifier. Alternatively, the session establishment request may be for a non-source specific multicast and provides a non-source specific destination IP multicast address and requests the allocation a general packet radio service tunneling protocol (GTP) tunnel identifier.

In certain example embodiments, the session establishment request may include a new multicast control information element that includes a multicast control information element identifier. The new multicast control information element may also include for at least one of a source Internet Protocol (IP) address, a destination IP multicast address, or a general packet radio service tunneling protocol (GTP) tunnel identifier either the requests for the allocation of a value by the user plane function or an applicable value. In some example embodiments, the session establishment request may include a forwarding action rule and a packet detection rule. In other example embodiments, the forwarding action rule may include an instruction for the user plane function to apply multicast and the multicast control information element identifier, and send outgoing multicast packets associated with the forwarding action rule. In further example embodiments, the packet detection rule may include an instruction for the user plane function of which incoming packets should be forwarded according to the forwarding action rule.

In certain example embodiments, the session establishment request may include a forwarding action rule with information elements requesting the user plane function to allocate the identifiers. In other example embodiments, the method may include receiving the session establishment response including the forwarding action rule with the identifiers selected by the user plane function. According to certain example embodiments, the method may further include receiving a session establishment response comprising the identifiers selected by the user plane function. According to other example embodiments, the session establishment response may include a multicast control information element with the same multicast control information element identifier as sent in the session establishment request and the identifiers selected by the user plane function.

Figure 4:
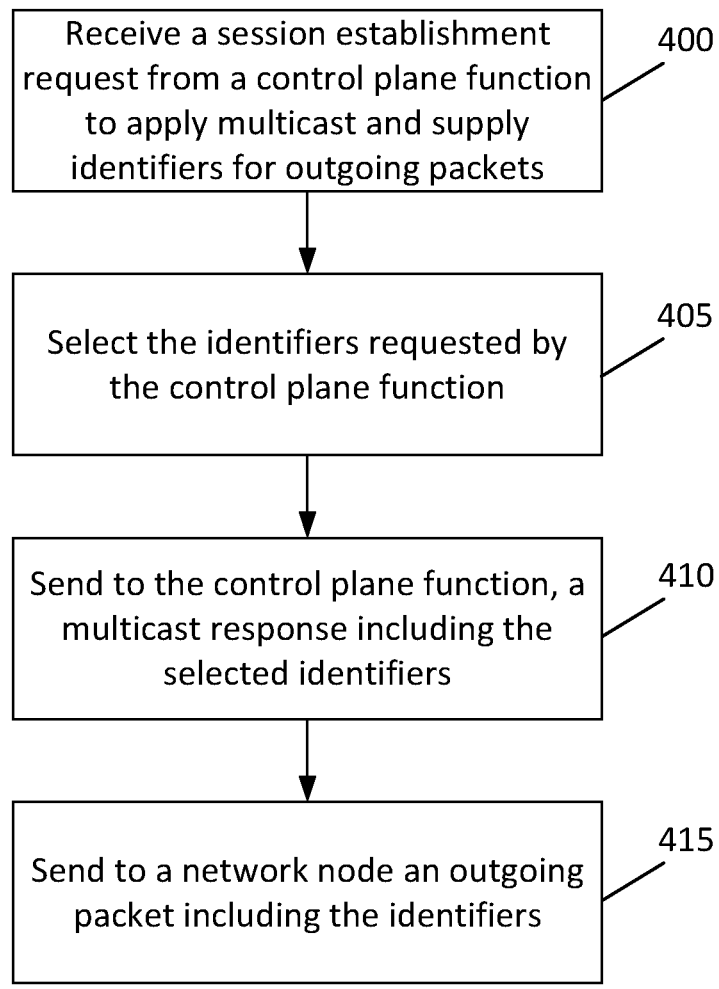
FIG. 4 illustrates a flow diagram of another method, according to certain example embodiments.

FIG. 4 illustrates a flow diagram of a further method, according to certain example embodiments. In an example embodiment, the method of FIG. 4 may be performed by a telecommunications network, network entity or network node in a 3GPP system, such as LTE or 5G-NR. For instance, in an example embodiment, the method of FIG. 4 may be performed by a UPF for instance similar to apparatus 20 illustrated in FIG. 5(b).

According to certain example embodiments, the method may include, at 400, receiving a session establishment request from a control plane function to apply multicast and supply identifiers for outgoing packets. The method may also include, at 405, selecting the identifiers requested by the control plane function. The method may further include, at 410, sending to the control plane function, a multicast response comprising the selected identifiers. In addition, the method may include, at 415, sending to a network node an outgoing packet comprising the identifiers.

According to certain example embodiments, the method may also include receiving an incoming packet from a network node with content to be distributed to one or more user equipment. According to other example embodiments, the method may include forwarding the incoming packet as an outgoing packet with the selected identifiers. According to further example embodiments, the method may include encapsulating the incoming packet as content in a new Internet Protocol (IP) and general packet radio service tunneling protocol (GTP) packet with the selected identifiers added to the new IP and GTP packet.

In certain example embodiments, the identifiers may include at least one of a source Internet Protocol (IP) address, a source specific destination IP multicast address, or a general packet radio service tunneling protocol (GTP) tunnel identifier. In other example embodiments, the GTP tunnel identifier may be selected from a range assigned to a user plane function. In some example embodiments, the session establishment request may be for a source specific multicast and requests the allocation of a source Internet Protocol (IP) address, a source specific destination IP multicast address, and a general packet radio service tunneling protocol (GTP) tunnel identifier. Alternatively, the session establishment request may be for a non-source specific multicast and provides a non-source specific destination IP multicast address and requests the allocation a general packet radio service tunneling protocol (GTP) tunnel identifier.

According to certain example embodiments, the session establishment request may include a new multicast control information element that includes a multicast control information element identifier. The new multicast control information element may also include, for at least one of a source Internet Protocol (IP) address, a destination IP multicast address, or a general packet radio service tunneling protocol (GTP) tunnel identifier either the requests for the allocation of a value by the user plane function or an applicable value. According to other example embodiments, the session establishment request may include a forwarding action rule and a packet detection rule. The forwarding action rule may include an instruction for a user plane function to apply multicast and the multicast control information element identifier, and send outgoing multicast packets associated with the forwarding action rule.

In certain example embodiments, the session establishment request may include a forwarding action rule with information elements requesting the user plane function to allocate the identifiers. In other example embodiments, the method may include sending the session establishment response including the forwarding action rule with the identifiers selected by the user plane function. According to further example embodiments, the method may include sending a session establishment response including the multicast control information element with the multicast control information element identifier and the identifiers selected by the user plane function, or the forwarding action rule with the identifiers selected by the user plane function.

Figure 5A:
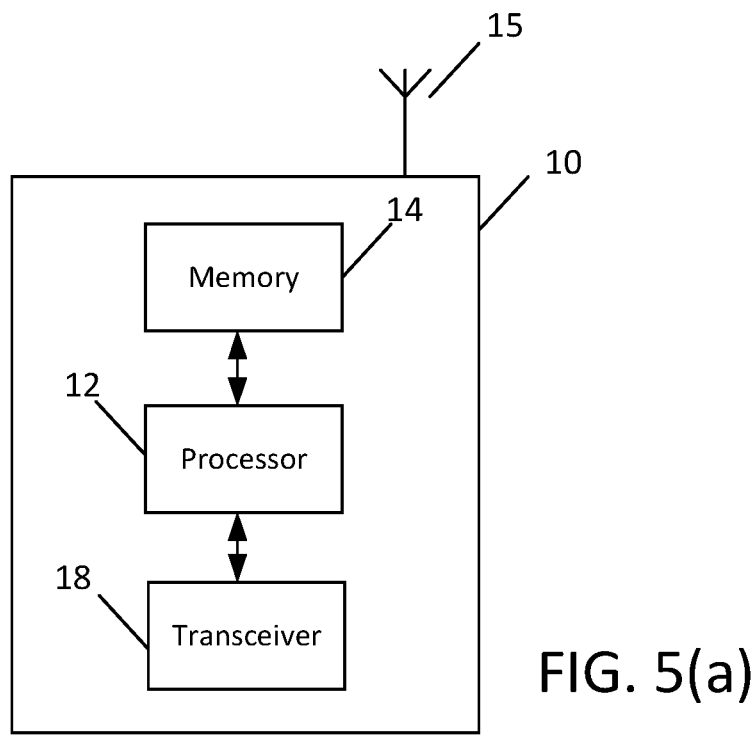
FIG. 5(a) illustrates an apparatus, according to certain example embodiments.

FIG. 5(a) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, or server in a communication network or serving such a network. For example, apparatus 10 may be a network element including, for example, a CPF.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 5(a).

As illustrated in the example of FIG. 5(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5(a), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-3.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-3.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in certain example embodiments, apparatus 10 may be controlled by memory 14 and processor 12 to send a session establishment request to a user plane function requesting the user plane function to apply multicast and supply identifiers for outgoing packets. Apparatus 10 may also be controlled by memory 14 and processor 12 to receive from the user plane function a multicast response comprising the requested identifiers. Apparatus 10 may further be controlled by memory 14 and processor 12 to establish a multicast tunnel with a network node.

Figure 5B:
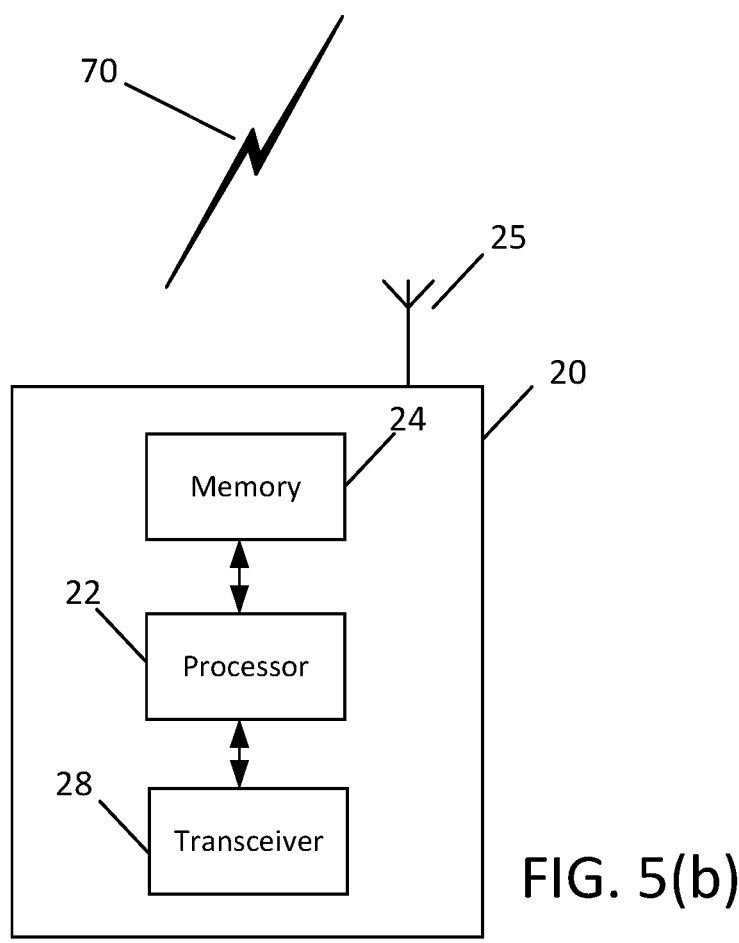
FIG. 5(b) illustrates another apparatus, according to certain example embodiments.

FIG. 5(b) illustrates an apparatus 20 according to an example embodiment. In an example embodiment, the apparatus 20 may be a network element, node, host, or server in a communication network or serving such a network. For example, apparatus 20 may be a network element including, for example, an AMF of 5GC, or a UPF. In other example embodiments, apparatus 20 may be a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 5(b).

As illustrated in the example of FIG. 5(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1, 2, and 4.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1, 2, and 4.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

As discussed above, according to certain example embodiments, apparatus 20 may be a UPF for example. According to certain embodiments, apparatus 20 may be controlled by memory 24 and processor 22 to perform the functions associated with example embodiments described herein. For instance, in certain example embodiments, apparatus 20 may be controlled by memory 24 and processor 22 to receive a session establishment request from a control plane function to apply multicast and supply identifiers for outgoing packets. Apparatus 20 may also be controlled by memory 24 and processor 22 to select the identifiers requested by the control plane function. Apparatus 20 may further be controlled by memory 24 and processor 22 to send to the control plane function, a multicast response comprising the selected identifiers. In addition, apparatus 20 may be controlled by memory 24 and processor 22 to send to a network node an outgoing packet comprising the identifiers.

Further example embodiments may provide means for performing any of the functions, steps, or procedures described herein. For example one example embodiment may be directed to an apparatus that includes means for sending a session establishment request to a user plane function requesting the user plane function to apply multicast and supply identifiers for outgoing packets. The apparatus may also include means for receiving from the user plane function a multicast response comprising the requested identifiers. The apparatus may further include means for establishing a multicast tunnel with a network node.

Other example embodiments may be directed to a further apparatus that includes means for receiving a session establishment request from a control plane function to apply multicast and supply identifiers for outgoing packets. The apparatus may also include means for selecting the identifiers requested by the control plane function. The apparatus may further include means for sending to the control plane function, a multicast response comprising the selected identifiers. In addition, the apparatus may include means for sending to a network node an outgoing packet comprising the identifiers.

Certain example embodiments described herein provide several technical improvements, enhancements, and/or advantages. In some example embodiments, it may be possible for a UPF controlled by a CPF to send packets via multicast transport. This allows avoiding sending replicated packets to multiple destinations via unicast transport, and to save related transport and processing resources for such replicated packets.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

5GC 5G Core
5GS 5G System
BM-SC Broadcast-Multicast Service Centre
CPF Control Plane Function
DL Downlink
eNB Enhanced Node B
FAR Forwarding Action Rule
gNB 5G or Next Generation NodeB
GTP GPRS Tunneling Protocol
LTE Long Term Evolution
MBSF Multicast/Broadcast Service Function
MBSU Multicast/Broadcast User Plane
MSF Multicast Service Function
MSF-C Multicast Service Function Control Plane
MSF-U Multicast Service Function User Plane
NEF Network Exposure Function
NR New Radio
PDR Packet Detection Rule
PFCP Packet Forwarding Control Protocol
SMF Session Management Function
UE User Equipment
UL Uplink
UPF User Plane Function

We claim:

1. An apparatus, comprising:
at least one processor; and
at least one memory comprising computer program code,
the at least one memory and computer program code are configured to, with storing instructions that, when executed by the at least one processor, cause the apparatus at least to:
receive a session establishment request from a control plane function to apply multicast and supply identifiers for outgoing packets,
wherein the session establishment request is for:
a source specific multicast and requests the allocation of a source Internet Protocol (IP) address, a source specific destination IP multicast address, and a general packet radio service tunneling protocol (GTP) tunnel identifier,
wherein the session establishment request comprises a new multicast control information element that comprises:
a multicast control information element identifier, and
an applicable value for each of a source IP address, a destination IP multicast address, and the GTP tunnel identifier,
wherein the session establishment request comprises a forwarding action rule and a packet detection rule,
wherein the forwarding action rule comprises an instruction for a user plane function to apply multicast and the multicast control information element identifier, and send outgoing multicast packets associated with the forwarding action rule, wherein the forwarding action rule includes information elements requesting the user plane function to allocate the identifiers,
wherein the packet detection rule comprises an instruction for the user plane function of which incoming packets are forwarded according to the forwarding action rule,
wherein the source IP address is selected by the user plane function from a range of addresses assigned to the user plane function,
wherein the source specific destination IP multicast address is selected from a source-specific multicast address range,
wherein the GTP tunnel identifier is selected by the user plane function from a tunnel identifier range assigned to the user plane function;
send, to the control plane function, a multicast response comprising the selected identifiers;
send to a network node an outgoing packet comprising the identifiers;
receive an incoming packet from the network node with content to be distributed to one or more user equipment;
forward the incoming packet as an outgoing packet with the selected identifiers;
encapsulate the incoming packet as content in a new Internet Protocol (IP) and general packet radio service tunneling protocol (GTP) packet with the selected identifiers added to the new IP and GTP packet; and
send a session establishment response comprising the forwarding action rule with said identifiers selected by the user plane function and the multicast control information element with the multicast control information element identifier and the identifiers selected by the user plane function.

* * * * *